United States Patent [19]

Dawson et al.

[11] Patent Number: 4,937,532

[45] Date of Patent: Jun. 26, 1990

[54] METHOD OF ACCELERATING PHOTONS BY A RELATIVISTIC PLASMA WAVE

[75] Inventors: John M. Dawson, Pacific Palisades; Scott C. Wilks, Santa Monica, both of Calif.

[73] Assignee: The Regents of the University of California, Berkeley, Calif.

[21] Appl. No.: 244,485

[22] Filed: Sep. 14, 1988

[51] Int. Cl.[5] .......... H01J 7/46; H01S 3/09

[52] U.S. Cl. .......... 330/4.3; 328/233

[58] Field of Search .......... 330/4.3; 332/751; 372/76; 328/233

[56] References Cited

U.S. PATENT DOCUMENTS 3,911,318 10/1975 Spero et al. .......... 330/4.3
4,110,595 8/1978 Brambilla et al. .......... 176/3
4,263,095 4/1981 Thode .......... 176/1

OTHER PUBLICATIONS

Wilks et al., "Frequency Up-Conversion . . . Overdense Plasma" Phys. Re. Lett., vol. 61, #3, pp. 337-340, 7/18/88, abst. Provided.
Tajima et al., "An Electro Accelerator Using a Laser", IEEE Trans, Nucl. Sci, Proc. 1979, PA Conf., vol. 26, #3, Pt-2, pp. 4188-4189, abst.
Joshi et al., "Vetrahigh Gradient . . . Plasma Density Waves", Nature, vol. 311, No. 5986, pp. 525-529, 10/11/84, abst. Provided.

*Primary Examiner*—Nelson Moskowitz
*Attorney, Agent, or Firm*—Flehr, Hohbach, Test, Albritton & Herbert

[57] ABSTRACT

Photons of a laser pulse have their group velocity accelerated in a plasma as they are placed on a downward density gradient of a plasma wave of which the phase velocity nearly matches the group velocity of the photons. This acceleration results in a frequency upshift. If the unperturbed plasma has a slight density gradient in the direction of propagation, the photon frequencies can be continuously upshifted to significantly greater values.

8 Claims, 2 Drawing Sheets

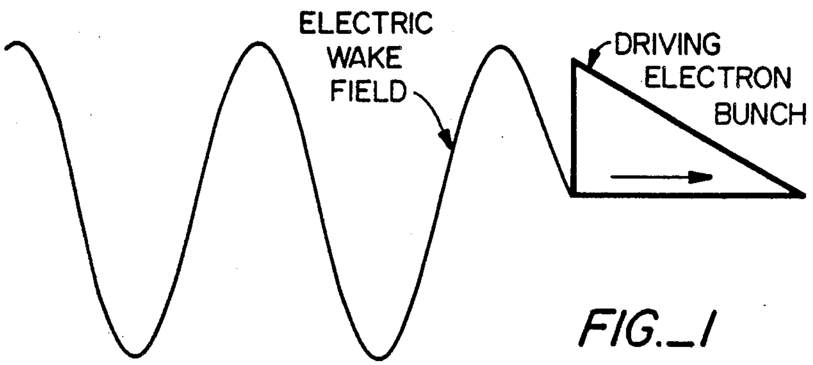
FIG._1
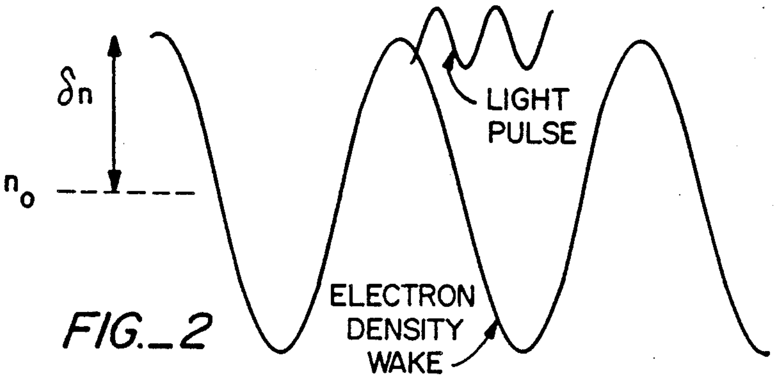
FIG._2
FIG._3
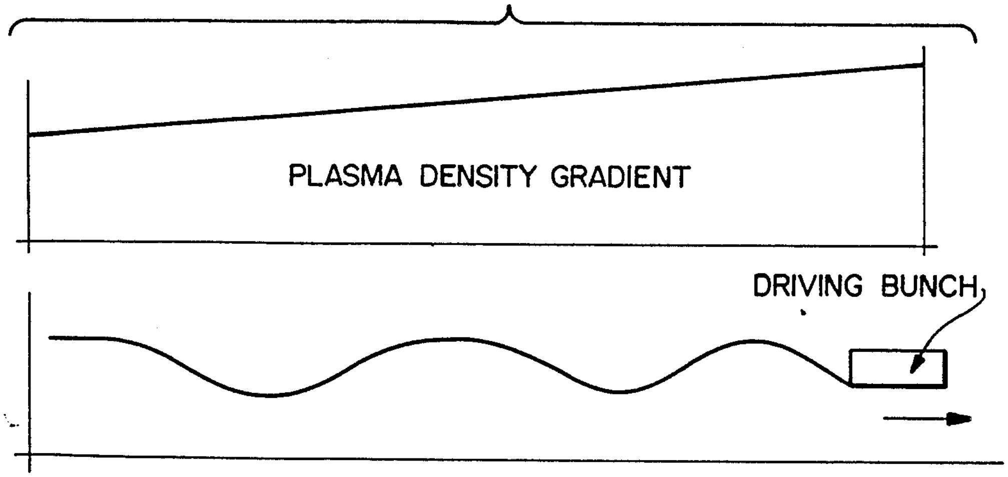

METHOD OF ACCELERATING PHOTONS BY A RELATIVISTIC PLASMA WAVE

BACKGROUND OF THE INVENTION

This invention was made with Government support under Grant Contract No. DE-FG 03-87-ER 13752 awarded by the DOE. The Government has certain rights in this invention.

This invention relates to a method of accelerating photons in a plasma and more particularly to a method of upshifting the frequency of a pulse of laser light by propagating it along a relativistic plasma wave.

It has been proposed and demonstrated by computer simulation that a pulse of intense laser light can be used to generate an intense plasma wave with phase velocity close to that of light (See "Laser Electron Accelerator" by T. Tajima and J. M. Dawson in Phys. Rev. Lett. 43, 267 (1979)). A wake of plasma oscillations is created by such an intense electromagnetic pulse through the action of the nonlinear ponderomotive force and electrons trapped in the wake can be accelerated. As such an intense plasma wave is used to accelerate electrons, the frequency of the light is degraded in the process.

In view of the above, the present inventors considered the feasibility of upshifting the frequency of light, or accelerating photons, by reversing the process described above, that is, by propagating photons along an intense plasma wave. It has been demonstrated that such an intense plasma wave can be generated by a beat-wave accelerator (as disclosed, for example, by T. Tajima and J. M. Dawson, ibid.) or a plasma wake-field accelerator (as disclosed, for example, in "Acceleration of Electrons by the Interaction of a Bunched Electron Beam with a Plasma" by P. Chen, J. M. Dawson, R. W. Huff and T. Katsouleas in Phys. Rev. Lett. 54, 693 (1985)).

SUMMARY OF THE INVENTION

It is an object of the present invention to provide a method of continuously upshifting the frequency of a laser light pulse to many times its original value by using an intense plasma wave.

According to a method of the present invention, a relativistic plasma wave is generated by the wake fileds of a bunch of relativistic electrons in a plasma and photons of a laser pulse are placed on a downward slope of this plasma wave such that the phase velocity of the plasma wave nearly matches the group velocity of the photons. If the unperturbed plasma has an appropriate density gradient in the direction of propagation, the photon frequencies can be continuously upshifted to significantly greater values.

BRIEF DESCRIPTION OF THE DRAWINGS

The accompanying drawings which are incorporated in and form a part of the specification, illustrate an embodiment of the present invention and, together with the specification, serve to explain the principles of the invention. In the drawings:

FIG. 1 is a drawing which schematically shows a wake field generated behind a relativistic electron bunch inside a plasma, FIG. 2 is a drawing which schematically shows a light pulse placed on a density gradient generated inside a plasma according to a method embodying the present invention, FIG. 3 is a drawing which schematically shows the effect of a gradient in plasma density on the method of the present invention.

DETAILED DESCRIPTION OF THE INVENTION

Figure 4:
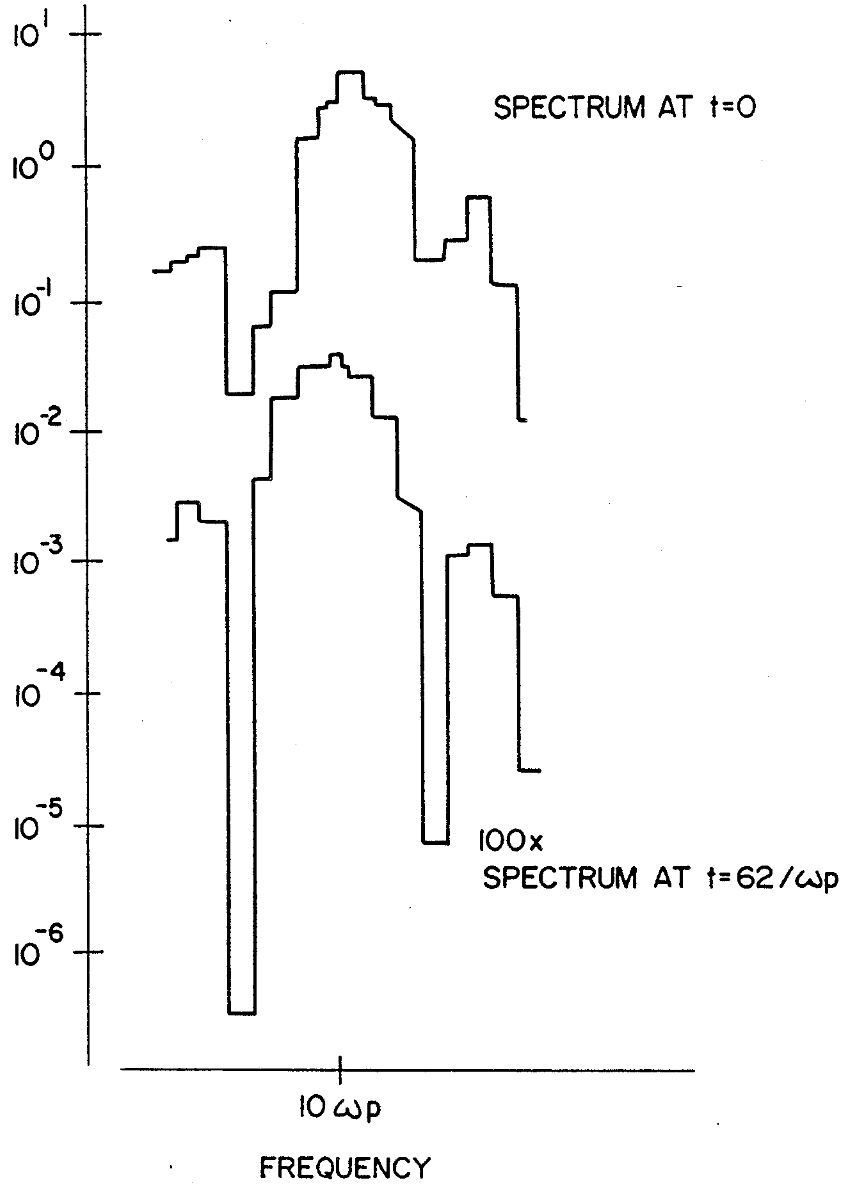
FIG. 4 is a spectrum diagram showing by a computer simulation an example of frequency shift by a method embodying the present invention.

When a bunch of relativistic electrons, say, from a linear accelerator passes through a region of a low temperature plasma, the plasma there sees an excess of negative charge and the plasma particles move so as to shield or neutralize the bunch field. This adiabatic shielding of the bunch field reduces the electric field which tends to retard the electron bunch. The shielding continues until the tail of the bunch exits the region. Then, the plasma, which was nearly neutral, is suddenly left with a non-neutral space charge of amplitude nearly equal to the charge density at the tail of the bunch and this sets up oscillations with the plasma frequency $\omega p$. The phase velocity $v_p$ of these waves is tied, or exactly equal to, the velocity of the electron bunch, which is almost that of light, although their group velocity is nearly zero. This is analogous to the wake of a boat following at the velocity of the boat. FIG. 1 shows a wake field generated behind a relativistic electron bunch inside a plasma disclosed, for example, in an article entitled "Physical mechanisms in the plasma wake-field accelerator" by T. Katsouleas published in the Physical Review A 33, 2056 (1986).

A pulse of laser light is caused to propagate through this plasma in the same direction as the electron bunch has traveled. Photons propagating in a plasma are known to behave like particles with a finite mass of $h\omega p/c^2$ (where h is the Planck's constant divided by $2\pi$ and c is the speed of light) traveling at the light group velocity $v_g = c(1-\omega p^2/\omega^2)^{1/2}$. The pulse and its duration are so controlled that its light group velocity $v_g$ is slightly lower than the velocity of the electrons (which is also the phase velocity of the plasma wave as explained above), that the length (longitudinal extension) of the wave packet represented by the pulse is no greater than a half wavelength of the wake field and that the pulsed wave packet is placed on the downward slope of the electron density in the wake field as shown in FIG. 2. If a Lorentz transformation is made from the laboratory frame shown in FIG. 2 to another frame moving with the electrons, the light pulse seems to be moving backwards (in this Lorentz frame) towards higher electron density regions and then is reflected, moving then forward down the electron density gradient. If a Lorentz transformation is made back then to the laboratory frame, it can be found that the frequency of the reflected light is upshifted. One of the novel features of the present invention is that the plasma density is gradually increased in the direction of propagation of the electron bunch such that the frequency of the laser pulse can be upshifted continuously from one that is easily generated (such as 1μ) to those that are difficult to generate (such as 1 to 100Å). As schematically illustrated in FIG. 3, if the plasma density increases gradually in the direction of propagation of the electron bunch, the wavelength of the wake becomes shorter as the bunch moves into a denser plasma region. This means that the crests of the wave advance faster than the bunch and keep up with the light wave pulse of which the group velocity is increasing as explained above. In other words, the light pulse appears (in the aforementioned Lorentz frame) to be continuously reflected from the plasma wave with its frequency continuously upshifted.

An analysis by the WKB approximation method gives the following formula for the rate of frequency upshift:

$$d\omega^2/dx=(\omega p^3/c)(\delta n/n_0)$$

where δn and $n_0$ are respectively the plasma wave density perturbation and the undisturbed density. If the right-hand side of the equation may be considered to be nearly constant, one obtains therefrom $$\omega f^2-\omega 0^2\sim(\omega p^3/c)(\delta n/n_0)L$$

where $\omega_0$ is the initial frequency and ωf is the final frequency with reference to a path length of L traveled by the electron bunch inside the plasma. If $\omega f^2$ is much larger than $\omega_0^2$, one approximately has the relationship $$\omega_f^2\sim(\omega p^3/c)(\delta n/n_0)L$$

If a region of length 20 cm is considered within a plasma of density $10^{18}$ (such plasmas having been produced experimentally) and if the plasma wave density perturbation is 0.2 $n_0$, the formula above says that light of wavelength about 1600 Å would be produced. If the plasma density can be raised to $10^{19}$, radiation at 50 Å can be generated. The initial light pulse might be one obtained from a Neodymium glass laser at $10^4$ Å.

Another feature of the present invention is that the group velocity of the photons is reduced by providing a plasma density gradient as illustrated in FIG. 3 such that it is kept-in phase with the traveling bunch. An analysis shows that the plasma density gradient should be such that the density would approximately double over a path length of $(4\omega^2c/\omega p^3)(n_0/\delta n)^{\frac{1}{2}}$.

Photon acceleration inside a plasma with a density perturbation was studied by a computer simulation. The result is illustrated in FIG. 4 which shows a photon spectrum at time t=0 and t=62/ωp with the horizontal axis representing the frequency. The spectrum curve for the later time is shifted upwards for clarity. The density perturbation of the plasma wave is 0.1 $n_0$ and its phase velocity matches the group velocity of the light with a frequency of 15ωp. The peak of the initial light pulse is 10ωp. The shift of the peak to the right means a shift to higher wave numbers and hence to higher frequencies. FIG. 4 shows a frequency shift of about 40%.

The foregoing description of a preferred embodiment of the invention has been presented for the purpose of illustration and description. It is not intended to be exhaustive or to limit the invention to the precise form disclosed. Many modifications and variations are possible in light of the above teaching. For example, a relativistic plasma wave need not necessarily be generated for the purpose of the present invention by passing an electron bunch from a linear accelerator. A relativistic plasma wave which can serve the purpose of the present invention can be generated, for example, by a beat-wave generator of the kind reviewed above. A wake-field accelerator as disclosed above is preferable, however, because it operates by simply displacing and releasing the background plasma and it is therefore not necessary to fine tune the plasma density to satisfy a resonance condition as in the beat-wave accelerator. In summary, any modifications and variations which may be apparent to a person skilled in the art are intended to be included within the scope of the present invention.

What is claimed is:

1. A method of accelerating photons comprising the steps of generating a relativistic plasma wave in a direction inside a plasma having a density gradient along said direction, and propagating photons along said plasma wave in said direction, the phase velocity of said plasma wave substantially matching the group velocity of said photons inside said plasma.

2. The method of claim 1 wherein said relativistic plasma wave is generated by the wake fields of a bunch of relativistic electrons.

3. The method of claim 2 wherein said bunch of relativistic electrons is propagated from a linear accelerator.

4. The method of claim 1 wherein said phase velocity of said plasma wave is slightly greater than said group velocity of said photons.

5. The method of claim 1 wherein said photons are from a pulse of laser light.

6. The method of claim 5 wherein said pulse is placed on a downward density gradient of said plasma wave.

7. The method of claim 1 wherein said photons are accelerated at a rate given approximately by the formula $$d\omega^2/dx=(\omega p^3/c)(\delta n/n_0)$$

where ω is the frequency of said photons, ωp is the plasma frequency of said plasma, c is the speed of light and δn and $n_0$ are respectively the density perturbation and the undisturbed density in said plasma wave.

8. The method of claim 1 wherein said density gradient is such that density of said plasma would approximately double over a path lenght of $(4\omega^2c/\omega p^3)(n_0/\delta n)^{\frac{1}{2}}$ *along said direction where* ω2 is the frequency of said photons, ωp is the plasma frequency of said plasma, c is the speed of light and δn and $n_O$ are respectively the density perturbation and undisturbed density in said plasma wave.

* * * * *